United States Patent
Lachhwani et al.

(10) Patent No.: US 7,401,289 B2
(45) Date of Patent: Jul. 15, 2008

(54) LAYOUT GENERATOR SYSTEM AND METHOD

(75) Inventors: Alka Lachhwani, Rego Park, NY (US); Andrea Bimson, Scottsdale, AZ (US); Laxmikant Dash, Phoenix, AZ (US); Biswajit A. Sarkar, Bayport, NY (US); Meena Gopakumar, Glendale, AZ (US); Kaustubh Kunte, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 589 days.

(21) Appl. No.: 10/012,080

(22) Filed: Dec. 6, 2001

(65) Prior Publication Data

US 2002/0116418 A1   Aug. 22, 2002

Related U.S. Application Data

(60) Provisional application No. 60/251,633, filed on Dec. 6, 2000.

(51) Int. Cl.
  *G06F 15/00* (2006.01)
(52) U.S. Cl. .................. 715/243; 715/249; 715/273; 715/788; 709/203
(58) Field of Classification Search ............... 715/517, 715/526, 514, 530, 512, 788, 243, 249, 273, 715/204; 345/619; 709/206, 227
See application file for complete search history.

(56) References Cited

U.S. PATENT DOCUMENTS

| | | |
|---|---|---|
| 5,504,891 A | 4/1996 | Motoyama et al. |
| 5,745,360 A | 4/1998 | Leone et al. |
| 5,745,908 A | 4/1998 | Anderson et al. |
| 5,781,914 A | 7/1998 | Stork et al. |
| 5,802,381 A | 9/1998 | Matsumoto et al. |
| 5,804,803 A | 9/1998 | Cragun et al. |
| 5,835,919 A | 11/1998 | Stern et al. |
| 5,845,299 A | 12/1998 | Arora et al. |
| 5,848,386 A | 12/1998 | Motoyama |
| 5,860,073 A | 1/1999 | Ferrel et al. |
| 5,893,127 A | 4/1999 | Tyan et al. |

(Continued)

OTHER PUBLICATIONS

Soft Quad, SoftQuad HoTMetal Pro 3.0, Jun. 1996, Second Edition, SoftQuad Inc., Toronto, Canada.

Primary Examiner—Stephen Hong
Assistant Examiner—Matthew J Ludwig
(74) Attorney, Agent, or Firm—Snell & Wilmer L.L.P.

(57) ABSTRACT

The present invention provides systems and methods for creating and editing electronic layouts, such as layouts used to create web pages, via digital networks. An exemplary system for creating an electronic layout suitably includes a server, a network, a database and one or more user interfaces. The server may suitably provide a layout editor configured to place one or more containers, areas and/or spacers onto a layout panel in response to inputs from a user and a layout manager configured to validate properties of the layout and to generate the layout. An exemplary method for creating a document layout suitably includes displaying a layout panel; placing at least one container on the layout panel to create the layout, the container comprising a software object representing a visual element; and storing the layout in a database for future use and/or editing.

45 Claims, 6 Drawing Sheets

U.S. PATENT DOCUMENTS

| | | | |
|---|---|---|---|
| 5,895,477 A | 4/1999 | Orr et al. | |
| 5,909,214 A | 6/1999 | Consolatti et al. | |
| 5,911,145 A | 6/1999 | Arora et al. | |
| 5,940,834 A | 8/1999 | Pinard et al. | |
| 5,953,731 A | 9/1999 | Glaser | |
| 5,953,733 A * | 9/1999 | Langford-Wilson | 715/517 |
| 5,956,736 A | 9/1999 | Hanson et al. | |
| 5,956,737 A | 9/1999 | King et al. | |
| 5,973,696 A | 10/1999 | Agranat et al. | |
| 5,987,403 A | 11/1999 | Sugimura | |
| 5,999,948 A | 12/1999 | Nelson et al. | |
| 6,002,874 A | 12/1999 | Bahrs et al. | |
| 6,003,046 A | 12/1999 | Nielsen | |
| 6,023,714 A | 2/2000 | Hill et al. | |
| 6,026,417 A | 2/2000 | Ross et al. | |
| 6,031,989 A | 2/2000 | Cordell | |
| 6,055,522 A | 4/2000 | Krishna et al. | |
| 6,061,697 A | 5/2000 | Nakao | |
| 6,072,486 A | 6/2000 | Sheldon et al. | |
| 6,144,974 A | 11/2000 | Gartland | |
| 6,157,943 A | 12/2000 | Meyer | |
| 6,161,114 A | 12/2000 | King et al. | |
| 6,161,124 A | 12/2000 | Takagawa et al. | |
| 6,308,188 B1 * | 10/2001 | Bernardo et al. | 715/530 |
| 6,466,944 B1 * | 10/2002 | Stokes | 707/102 |
| 6,675,299 B2 * | 1/2004 | Porter et al. | 726/26 |
| 6,714,928 B1 * | 3/2004 | Calow | 707/4 |
| 6,826,727 B1 * | 11/2004 | Mohr et al. | 715/517 |
| 6,981,214 B1 * | 12/2005 | Miller et al. | 715/517 |
| 7,117,260 B2 * | 10/2006 | Bimson et al. | 709/223 |
| 7,293,230 B2 * | 11/2007 | Bimson et al. | 707/E17.118 |
| 2003/0163585 A1 * | 8/2003 | Elderon et al. | 709/246 |

* cited by examiner

LAYOUT GENERATOR SYSTEM AND METHOD

CROSS REFERENCE TO RELATED APPLICATIONS

This application claims priority to U.S. Provisional Patent Application Serial No. 60/251,633, entitled "Layout Generator System," filed Dec. 6, 2000, which is incorporated herein by reference.

FIELD OF INVENTION

The invention generally relates to information systems, and more particularly to systems and methods for providing electronic page layouts to designers via digital networks.

BACKGROUND OF THE INVENTION

With increased use of digital networks such as the Internet, many businesses and other entities have found it beneficial to have their own web sites. Typically, a corporate web site may include multiple pages, for example, for multiple departments within the business, for multiple products or services and the like. In creating such sites, a business often finds it beneficial to maintain a uniform "look and feel," throughout its site, to improve consistency and ease of use. To achieve that uniform look and feel, businesses typically develop guidelines for their employees to follow when developing web pages. These guidelines typically define certain aspects of look and feel, content and procedures for creating and making changes to a web page. One aspect of these guidelines is often directed to the overall layout of given web page. For example, one business may specify that each of its web pages include an identical company banner at the top of the page, similar margins at the sides and bottom of the page, a similar color scheme for the background and lettering on the page and the like.

Due to rapid technological changes and the need to frequently update electronic layouts, guidelines for creating and changing those layouts may themselves change very rapidly as well. For example, in the context of corporate web sites, described above, web site content and format may be updated very frequently. Other examples of electronic layouts provided via digital networks may include any type of electronic layout used on television, electronic message boards, billboards, scoreboard displays, airport displays, cell phones, personal digital assistants ("PDAs"), digital pagers and the like.

In the context of a large corporation, many employees may typically provide or suggest new web page layouts and content for the business. Some of these employees may have limited, if any, knowledge of computer programming and may not understand how to create a web page layout, how to provide their suggestions for a web page in efficient ways or how to achieve the uniform look and feel for a given web page that their business hopes to achieve. The combination, described above, of rapidly changing technology, the desire of businesses to keep their web sites current as well as relatively uniform in appearance, and the input of suggestions for web pages from many different employees may create a drain on an information technology ("IT") department in a large corporation. For example, such a department may spend a large amount of time and resources manually developing new web page layouts and either inputting content into those layouts or creating content that matches those layouts. Some currently available systems, such as the Microsoft Frontpage software, available from Microsoft Corporation of Redmond, Wash., which is hereby incorporated by reference, provide web page creation tools. Current systems, however, do not provide a method for web page layout creation that is accessible by multiple employees in a corporation, via a network, that maintains a uniform look and feel for web pages created within a corporation, and that enables employees with little or no technical background to create, change and enter content into web page layouts.

A need therefore exists for systems and methods for efficiently creating web page layouts within a business setting. A need also exists for systems for creating web page layouts with a uniform look and feel. Ideally, such systems would be accessible by employees of a business via a network and would enable employees with little or no knowledge of computer programming to create and change web page layouts and to use those layouts as templates for creating web pages.

BRIEF DESCRIPTION OF EXEMPLARY EMBODIMENTS

An exemplary system for creating a document layout suitably includes a layout editor configured to place one or more containers onto a document template in response to inputs from a user; a layout manager configured to validate properties of the document layout and to generate the document layout; and a data storage system configured to store the document layout. An exemplary method for creating a document layout suitably includes displaying a document template; placing at least one container on the document template to create the document layout, the container comprising a software object representing a visual element; and storing the document layout in a data storage system.

A further exemplary system for creating a document layout via a digital network suitably includes a layout server system and a database. The layout server system suitably includes a network interface configured to receive a request for a connection from a client computer and an application server module configured to provide a layout manager application to the client computer, wherein the layout manager application is configured to create the document layout based upon inputs received at the client computer, and wherein the application server module is further configured to receive the document layout from the layout manager application. The database is configured to receive the document layout from the application server and store the document layout.

BRIEF DESCRIPTION OF THE DRAWINGS

The above and other features and advantages are hereinafter described in the following detailed description of illustrative embodiments to be read in conjunction with the accompanying drawing figures, wherein like reference numerals are used to identify the same or similar parts in the similar views, and.

DETAILED DESCRIPTION OF EXEMPLARY EMBODIMENTS

Various systems as described herein facilitate the generation of web page layouts. In this regard, the description that follows sets forth various exemplary embodiments of the invention only, and is not intended to limit the scope, applicability, or configuration of the invention in any way. Rather, the following description is intended to provide convenient illustrations for implementing different embodiments of the invention. As will become apparent, various changes may be made in the function and arrangement of the elements described in these embodiments without departing from the scope of the invention. For example, changes may be made in the design and arrangement of the software components or architecture described in the exemplary embodiments without departing from the scope of the invention as set forth in the appended claims.

Various embodiments of the invention provide a web page layout generator, which enables users to efficiently create and manage web page layouts and web pages, with little or no knowledge of computer programming. In one embodiment, a layout generator system allows a user to develop new web page layouts by "drawing" the layouts and specifying basic features. The system then facilitates the generation of the equivalent technical code for the design. The technical code may then be utilized by a content management utility. The present system may be used in conjunction with a content management utility or any other hardware or software mechanism which allows users to create web content with minimal technical expertise, such as the system in, for example, the "Content Management Application For An Interactive Environment" which is the subject of U.S. patent application Ser. No. 09/769,924, filed on Jan. 25, 2001, which is hereby incorporated by reference. The output of the system may be in generic XML language or any other format and may be utilized by the "Content Management Application for an Interactive Environment," running on a Vignette Story Server platform, for example.

The systems and processes described herein may be described with reference to functional block components, screen shots, optional selections and various processing steps. It should be appreciated that such functional blocks may be realized by any number of hardware and/or software components configured to perform the specified functions. For example, the systems described herein may employ various client and server computers, including conventional hardware components, such as memory elements, processing elements, logic elements, look-up tables, and the like, which may carry out a variety of functions under the control of one or more microprocessors or other control devices. Similarly, the software elements described herein may be implemented with any programming or scripting language such as C, C++, Visual C++ (available from the Microsoft Corporation of Redmond, Wash.), PASCAL, Java, any database programming language or the like, with the various algorithms being implemented with any combination of data structures, objects, processes, routines or other programming elements. Further, it should be noted that the invention may employ any number of conventional techniques for data transmission, signaling, data processing, network control, and the like.

Many different embodiments of the invention may be formulated. For example, in one embodiment, a network may include any system for exchanging data or transacting business, such as the Internet, an intranet, an extranet, WAN, LAN, satellite communications, and/or the like. Similarly, various embodiments could be used in conjunction with any type of personal computer, network computer, workstation, minicomputer, mainframe, or other computer running any operating system such as any version of Windows, Windows NT, Windows2000, Windows 98, Windows 95, MacOS, OS/2, BeOS, Linux, UNIX, or any other operating system. Moreover, it will be readily understood that the invention could also be implemented using IPX, Appletalk, IP3, IP-6, NetBIOS, OSI or any number of existing or future protocols. Additionally, the system contemplates the use, sale or distribution of any goods, services or information over any network having similar functionality described herein.

Various aspects of the present invention may be embodied as methods, data processing systems, devices for data processing, computer program products and the like. Various aspects may take the form of a computer program product, embodied as computer-readable program code on a computer-readable storage medium. Any suitable computer-readable storage medium may be utilized, including hard disks, CD-ROM, optical storage devices, magnetic storage devices, SRAM, DRAM and/or the like.

Communication between users and the system of the invention may be accomplished through any suitable communication medium, such as, for example, a local or wide-area network, a telephone network, intranet, Internet, point of interaction device (point of sale device, personal digital assistant, cellular phone, kiosk, etc.), online communications, off-line communications, wireless communications, and/or the like. For security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Various embodiments of the invention are described on the attached documents with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The particular implementations shown and described herein are illustrative of exemplary embodiments only and are not intended to otherwise limit the scope of the invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
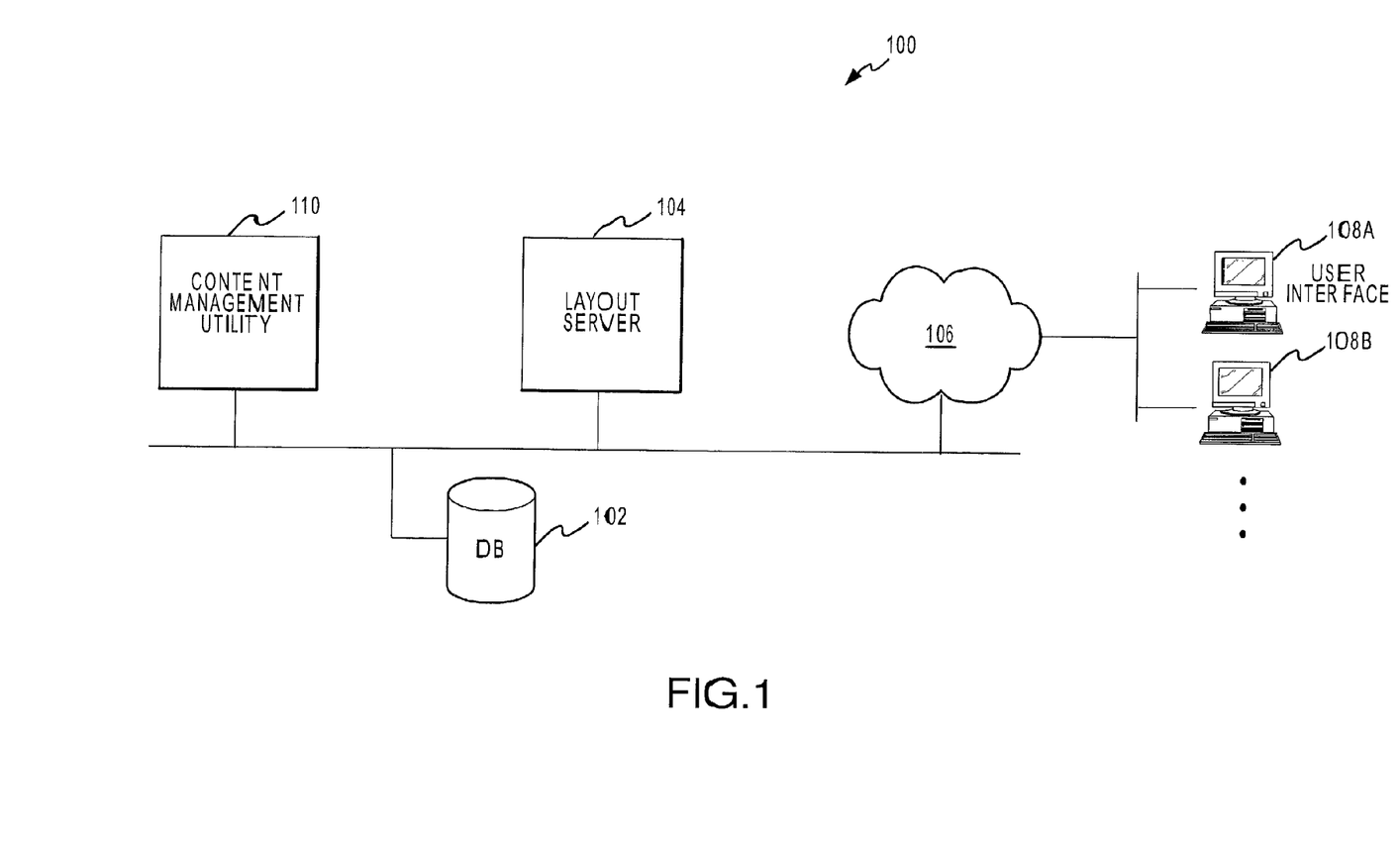
FIG. 1 is a block diagram of an exemplary system for providing a web page layout generator to one or more client systems.

FIG. 1 is a block diagram of one embodiment of a layout generator system 100 for providing electronic layouts via digital networks. With reference to FIG. 1, layout generator system 100 suitably includes a layout server 104, a content management utility 110, a database 102, a network 106 and one or more user interfaces 108. For purposes of this document, a "layout" includes any template, format or the like that is used to position, organize or arrange content within a document. Documents may be, for example, web pages, word processing files, electronic files associated with billboards, scoreboards, advertisements or displays, or any other type of electronic document.

Layout server 104 is configured to administer the processes of creating, maintaining and distributing electronic layouts. In a broad embodiment, layout server 104 provides applets to the various client computers 108 to facilitate the creation of layouts that may be eventually used as templates or other raw material for the creation of web pages. Layout server is further operable to receive created templates from the client computers 108 and to store the templates in database 102. Layout server may also facilitate review and approval processes for the templates, as set forth more fully below.

Layout server 104 is suitably implemented with any type of personal computer, workstation or the like which typically includes at least one processor, digital memory and some form of mass storage such as a hard drive or optical disk. Software stored in mass storage and/or in memory includes an operating system (such as any version of WINDOWS, UNIX, LINUX, MacOS, or the like) and an application program configured to administer the layout processes as described above and as defined more fully below. This application program typically includes a internet web server capable of receiving connections from various client systems 108, as well as functionality for interacting with client system 108 and database 102.

Content management utility 110 is configured to receive one or more electronic layouts from database 102 and to blend those layouts with content input by one or more users and/or designers. In one embodiment, content management utility 110 is configured as a server system, similar to layout server 104 described above. Content management utility 110 may also be configured to communicate with one or more components of layout generator system 100 via a network. A content management utility is described in much greater detail in U.S. patent application Ser. No. 09/769,924, filed on Jan. 25, 2001, previously incorporated by reference.

Database 102 is configured to store electronic layouts and to retrieve layouts for access by various other components of layout generator system 100. In various embodiments, database 102 may be any type of database, such as relational, hierarchical, object-oriented, and/or the like. Common database products that may be used to implement database include DB2 by IBM (White Plains, N.Y.), any of the database products available from Oracle Corporation (Redwood Shores, Calif.), Microsoft SQL Server by Microsoft Corporation (Redmond, Wash.), or any other database product. Database may be organized in any suitable manner, and may physically reside on any platform that is in communication with layout server 104. Database 102 may be maintained in mass storage associated with layout server 104, for example, or on a separate database server computer. In one exemplary embodiment, templates may be stored within the file system of layout server 104.

Network 106 is any suitable medium for providing communication between various other elements of layout generator system 100. Any computing units utilized by layout generator system 100 according to one embodiment of the present invention may be connected with each other via network 106. Network 106 may include a public network, such as the Internet, or may include one or more private networks such as an intranet, an extranet, WAN, LAN and/or the like. In one embodiment, where network 106 is the Internet, the computers may not be connected to the Internet at all times. For instance, one user's computer may employ a modem to occasionally connect to the Internet, whereas a layout designer's computer system might maintain a permanent connection to the Internet. Specific information related to the protocols, standards, and application software utilized in connection with the Internet are not being discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The various elements of layout generator system 100, namely layout server 104, content management utility 110, database 102 and user interfaces 108, may be suitably coupled to network 106 via data links. A variety of conventional communications media and protocols may be used for data links, such as a connection to an Internet Service Provider (ISP) over the local loop as is typically used in connection with standard modem communication, cable modem, dish networks, ISDN, Digital Subscriber Line (DSL), or various wireless communication methods. One or more computer systems might also reside within a local area network (LAN) which interfaces to network 106 via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Client computers 108a-b are any computer systems capable of communicating with layout server 104 via network 106 such as, for example, a personal digital assistant (PDA), personal computer, workstation, cellular phone or any other device. In an exemplary embodiment, client computers 108 include a personal computer having a processor, memory and operating system such as any conventional PC running any version of the WINDOWS operating system. Client systems 108 suitably communicate with the layout generator system 100 through any technique, such as through a conventional browser (e.g. Internet Explorer or Netscape browsers). Accordingly, client systems 108 typically include a user interface for displaying information to the user and for receiving inputs from the user via a keyboard, mouse, touchpad or the like. Client system 108 may be physically located in any home or business environment with access to network 106.

With continued reference to FIG. 1, an exemplary system 100 for creating layouts suitably includes a user of a client computer 108 opening a browser or other appropriate application and contacting layout server 104. In an exemplary embodiment, contact is made by entering a uniform resource locator (URL) into a browser window, or by selecting an appropriate bookmark or link to server 104. After a connection between client computer 108 and server 104 is established, server 104 suitably provides an applet, ActiveX control or other program to client computer 108 that allows the user to create the layout as appropriate. Completed layouts are then transmitted from client computer 108 to layout server 104 in any format (e.g. XML format) for storage within database 102. Server 104 may further provide for review and approval of templates by senior designers, management, clients or others before the templates become available for use in actual documents.

In various embodiments, layouts stored in database 102 are retrieved by one or more document designers who insert content into the layouts to create documents such as web pages. This process may be facilitated using a content management utility 110 that retrieves layouts from database 102 and provides the layouts to document designers as appropriate. Document designers may coincide with client systems 108 in various embodiments, although in other embodiments document designers use different systems entirely.

Figure 2A:
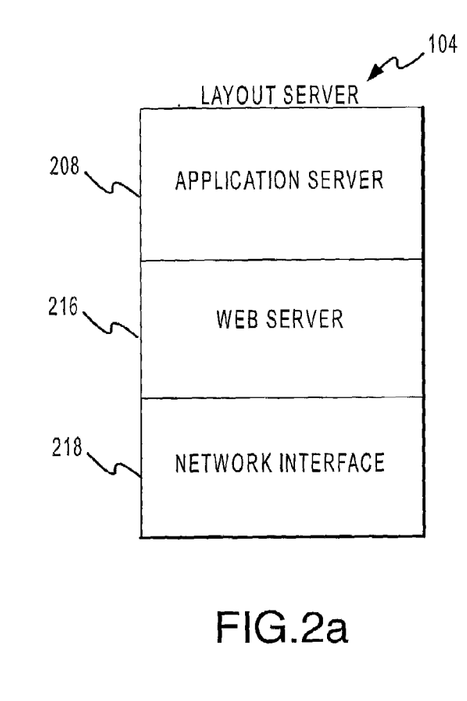
FIG. 2a is a block diagram showing exemplary components of a client application.
Figure 2B:
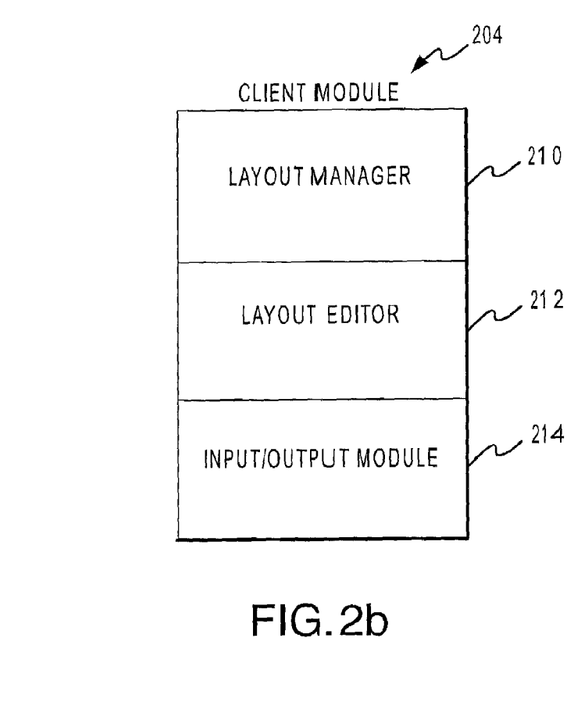
FIG. 2b is a block diagram showing exemplary components of a server application.

FIGS. 2a and 2b are block diagrams showing exemplary software configurations for layout server 104 and client module 204, respectively. With reference to FIG. 2a, in one embodiment, layout server 104 includes an application server 208, a web server 216 and a network interface 218. Network interface 218 suitably provides input and output functionality between server 104 and network 106 (FIG. 1). Web server 216 is any conventional web server (such as Microsoft Internet Information Server, Apache Web Server, or the like) that is capable of receiving requests for hypertext transport protocol (HTTP), secure HTTP (HTTPS) or other appropriate connections. Web server 216 is further operable to exchange data between application server 208 and client computers 108 using network interface 218 to network 106.

Application server 208 includes any hardware and/or software program or module configured to provide an electronic layout generation application to one or more client systems 108 via web server 216. The electronic layout generation application may be, for example, a Java applet, ActiveX control or other application as described below. Application server 208 may also provide for user authentication via a userid/password or other credential, as well as an interface for communications between client system 108 and database 102 (FIG. 1). Additional detail about application server 208 is described below.

With reference to FIG. 2b, in one embodiment, client module 204 suitably includes a layout manager 210, a layout editor 212 and an input/output module 214. The layout editor 212 module enables users of client systems 108 to create and/or modify document layouts, as described in further detail below. In an exemplary embodiment, layouts are created by the user manipulating a keyboard, mouse, touchpad or other interface device on client system 108 to draw or otherwise form a document layout on a display. Layouts may be formed by placing various components (such as areas, spacers and containers, described below) onto a layout page. Further, various parameters (size, border type, style, etc.) may be entered into dialog boxes associated with one or more of the layout components, and components may be moved, resized or otherwise modified using the mouse or touchpad, as appropriate.

Layout manager 210 includes a programming module configured to validate electronic layouts 108 by ensuring that the various parameters defined or entered by the user are logically consistent. Input/output module 214 accepts inputs relating to electronic layouts, content and the like from user interfaces 108 and provides for transmission of electronic layouts to database 102.

Briefly, the interaction between the server module 104 and the client module 204 includes a user at a client system 108 that suitably establishes an HTTP connection to layout server 104 via network 106. Server 104 receives the connection via network interface 218 to network 106, and establishes a session with the client using web server 216. The user is authenticated with a userid/password or other appropriate credential (e.g. digital signature, smartcard, biometric imprint, etc.) and a client module 204 is provided to client system 108 via the web connection established through interface 218. The client module, which may be implemented with a Java applet or similar application, includes routines for creating and editing the document layout (i.e. layout editor 212), for validating the layout (i.e. layout manager 210), and for communicating with layout server 104 (i.e. I/O module 214).

Figure 3A:
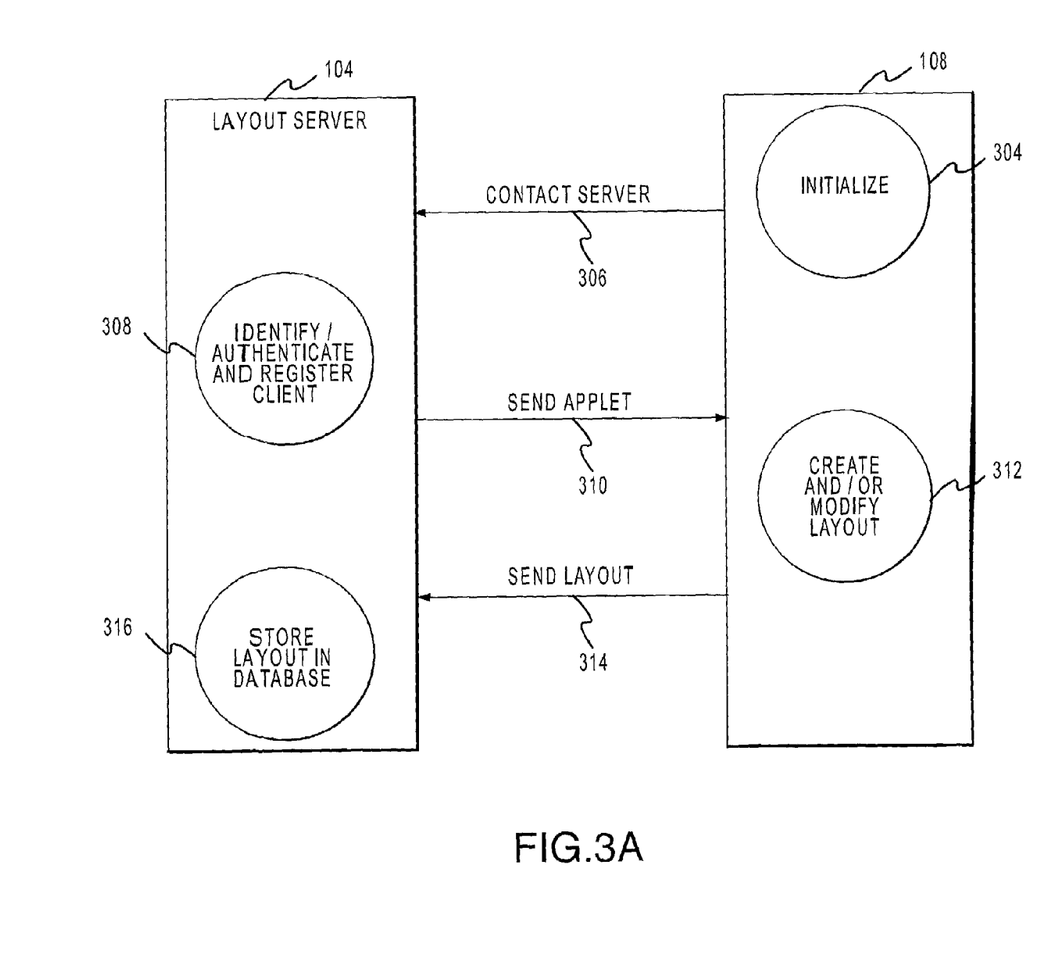
FIG. 3a is a flowchart of an exemplary process for creating a web page layout.

FIG. 3a is a flow diagram showing an exemplary method for creating an electronic layout using layout generator system 100. A user initializes client system 108 (step 304) by initiating a browser session on client system 108. After the browser is activated, the user suitably establishes a connection 306 between client system 108 and layout server 104, as appropriate. This connection may be established according to any conventional technique such as entering a URL into an appropriate browser window or clicking on an appropriate link or bookmark to create an HTTP session between client system 108 and layout server 104. When connection 306 is established, the user suitably provides identification/authorization information such as a userid/password combination or other credential to layout server 104. Layout server 104 appropriately processes the credential to verify that the user is authorized to use the layout creation system by checking the credential against information maintained in database 102, or elsewhere as appropriate. If the credential is not approved, the layout server 104 denies the user further access to the system. If the credential is approved, layout server 104 suitably registers the client with the system and allows the session to proceed.

After registering the user, layout server 104 suitably sends a Java applet or other appropriate software tool 204 for electronic layout creation to client computer 108 (step 310). When client application 108 receives the tool, the user is permitted to create and/or modify an electronic layout by executing the software tool within the browser session previously established (step 312). The user creates/modifies layouts by interacting with graphical user interface provided by the software tool that allows the user to "draw" elements such as areas, spacers and containers into the layout. The software tool further allows users to modify various parameters of the layout elements, as described more fully below in conjunction with FIG. 5. The completed layout may be formatted and stored in any appropriate format, such as extensible markup language (XML) or any other format. The layout manager portion of software tool 204 typically converts the data input by the user to an XML format that may be appropriately read and modified by another software tool 204 or other editing program. Layouts are appropriately stored in database 102 (FIG. 1) through interaction of the software tool executing on client system 108 with layout server 104. Accordingly, the software tool provides edited layouts to layout server 104 via network 106 (step 314), which stores the layout as appropriate (step 316).

Figure 3B:
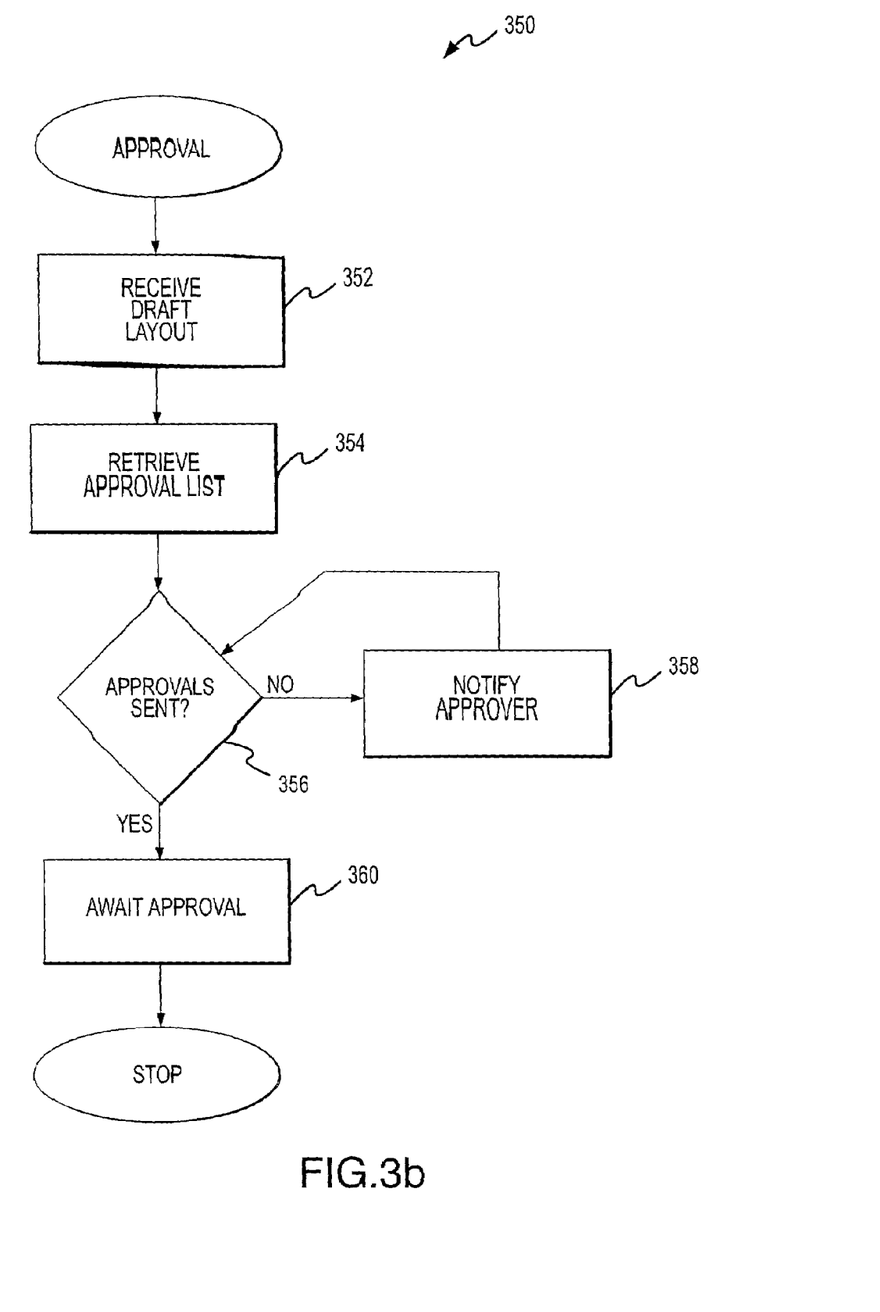
FIG. 3b is a flow diagram for an exemplary process for approving a document template.

FIG. 3b is a flow diagram for an exemplary process for approving a document template. With reference now to FIG. 3B, an exemplary process 350 suitably includes receiving a draft layout (step 352), obtaining an approval list for the particular user (step 354), notifying approvers as appropriate (steps 356 and 358) and awaiting approval of the layout (step 360). Because users of the system are authorized and authenticated using a userid/password or other credential, customized approval processes may be created for particular users or for groups of users. For example, a web designer may seek approval for a particular layout from a department manager, business client, trademark or branding representative, or the like before the template is made available to other users. One way to accomplish custom approvals is to associate a list of approvers with an object representing the user in database 102, or elsewhere as appropriate. Alternatively, approval lists may be associated with groups of users (each of which has an identical approval chain) by associating user objects with workgroup objects, and then further associating the workgroup objects with a particular list of approvers. In an exemplary embodiment, layout server 104 appropriately retrieves an approval list (step 354) from database 102 (or elsewhere as appropriate) to determine the personnel to review and approve the layout created by a particular user. Each approver is then notified that a draft layout is available for review and approval (steps 356, 358). Notification may take place automatically via electronic mail, instant message, or the like. Alternatively, the notification steps may be omitted in alternate embodiments, and approval personnel may simply poll the layout server 104 at periodic or other intervals to check if any layouts are awaiting approval. As each approver reviews and approves the layout, the approval is noted in database 102 (for example, in metadata associated with the layout). Approvers may be reminded at later times if they fail to review the layout within a certain time, or approval may be determined to be automatically granted if no objections are logged within a particular time. In various embodiments, approvers may modify layouts online (using the software tool 204 as described above), may provide comments to the layout developer (via e-mail, instant message, or the like), or may store comments with metadata associated with the layout in database 102. The approval process shown in FIG. 3b is an exemplary process; other practical processes may of course be formulated without departing from the scope of the invention.

After the layout is properly approved by any and all required approvers, the layout becomes available for use in documents. The layout may be distributed or otherwise made available via any technique, such as publication through a content management utility as described above. In an exemplary embodiment (and with momentary reference again to FIG. 1), the approved layout is stored in database 102 where it is available for retrieval by content management system users as described in U.S. patent application Ser. No. 09/769,924, filed on Jan. 25, 2001, previously incorporated by reference.

Figure 4:
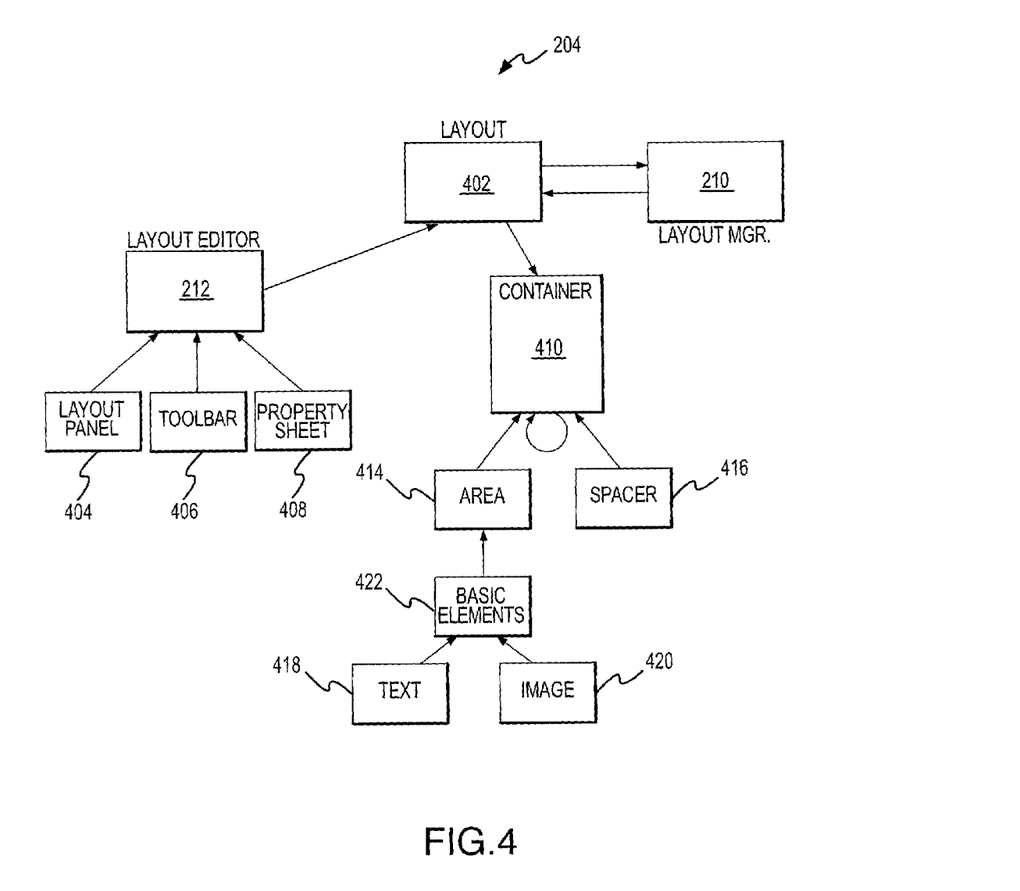
FIG. 4 is a block diagram of an exemplary set of objects usable for creating a web page.

FIG. 4 is an object diagram of an exemplary software tool 204. With reference to FIG. 4, an exemplary client module 204 suitably includes layout editor 212, layout manager 210 and a layout 402, which includes one or more containers 410, areas 414, spacers 416 and other elements described further below. The various components shown in FIG. 4 are described herein as software objects that inter-relate to form a software tool 204; alternate embodiments, however, may use radically different object structures, or may be created without using objects at all. As such, the various objects may be thought of as logical modules that provide various functionalities; different embodiments of the invention may alter, eliminate or enhance any of the functionalities described herein or implement them in radically different ways.

An exemplary embodiment of layout editor 212 includes a layout panel 404, a toolbar 406 and a property sheet 408. Layout editor 212 is generally configured to allow a user interface 108 to create or edit layout 402. Layout panel 404 is configured to display layout 402 on user interface 108 as layout is being generated or edited. In one embodiment, layout panel 404 may include toolbar 406 and property sheet 408. Toolbar may be configured to provide user interface 108 with a list of elements to place on layout 402. Examples of elements listed on toolbar 406 may include "containers," "areas" and "spacers." When user interface 108 chooses "container" from toolbar 406, typically by clicking or otherwise selecting "container," property sheet 408 is displayed as appropriate. Property sheet 408 allows user interface 108 to choose properties for container 410. Other examples of elements which may be listed on toolbar 406 include, but are not limited to, area 414 and spacer 416. An exemplary method for placing containers 410, areas 414 and spacers 416 on layout 402 and choosing their properties via property sheets 408 is described further below.

Containers include software objects (or modules) that have various user-definable characteristics and that represent sections of a layout. With continued reference to FIG. 4, container 410 is a section of a document layout configured to enable user interface 108 to arrange additional containers 412, areas 414 and/or spacers 416 in a particular manner to create layout 402. Thus, in one embodiment, container 410 may contain one or more other containers 410, one or more areas 414 and/or one or more spacers 416. Areas 414 may include regions of the layout that are relatively static and that exhibit particular attributes such as a foreground or background color, border type, border thickness, font type, text color and style, or the like. Spacers 416 include objects that provide gaps between various areas of the layout.

In one embodiment, container 410 may contain one or more areas 414 and/or spacers 416, as well as other containers 410. Additionally, areas 414 may be configured to contain various basic elements 422. Basic elements 422 may include text elements 418, image elements 420 or any other suitable elements which may be included in areas 414, such as programming elements, links and the like. Text elements 418 and/or image elements 420 may be chosen for inclusion in an area 414 and then converted into basic elements 422, which may be XML strings. Text elements 418 and/or image elements 420 may include the content of the document which is being formed via document layout 402. Thus, in one embodiment, areas 414 may be configured in relation to other areas 414 and/or spacers 416, and to exhibit certain attributes represented by basic elements 422 such as text 418 and images 420.

Spacers 416 may be configured create spaces between adjacent containers 410, adjacent areas 414 or a container 410 adjacent to an area 414. In one embodiment, spacers 416 may be configured not to contain other elements, such as other spacers 416, areas 414 or basic elements 422.

Despite the foregoing description of one exemplary embodiment of containers 410, areas 414 and spacers 416, many other suitable embodiments and combinations are contemplated within the scope of the present invention. For example, areas 414 may be configured to contain containers 410, spacers 416 may be configured to contain areas 414 or basic elements 422, and the like. In fact, any combination of containers 410, areas 414 and spacers 416 suitable for generating layouts 402 may be used as part of the present invention and, therefore, falls within the scope of the invention.

Figure 5:
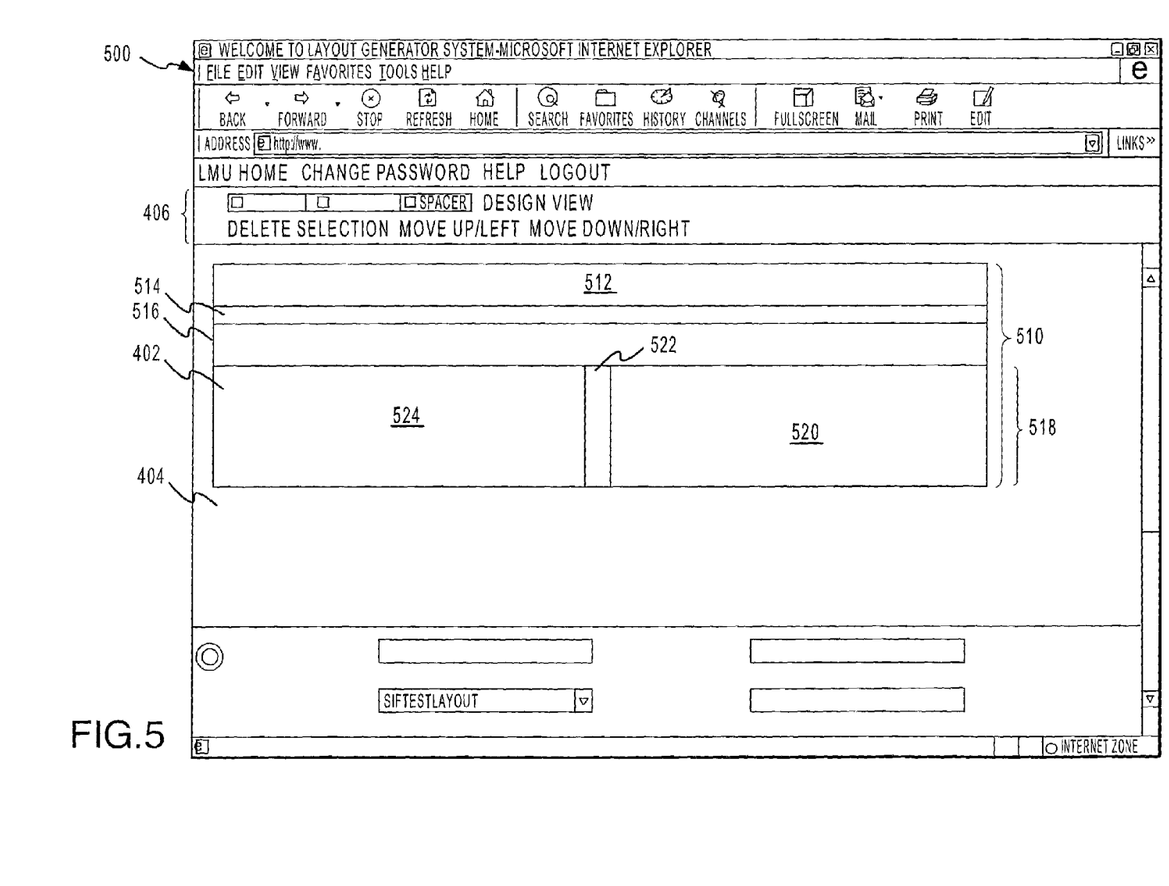
FIG. 5 is a screen shot showing an exemplary layout editor application and an exemplary layout according to one embodiment.

FIG. 5 is a screen display, showing an exemplary embodiment of a display 500 created by layout generator system 100. Display 500, which may be positioned on web browser display as in FIG. 5, suitably includes layout panel 404, toolbar 406 and a layout 402 created by a user. Layout 402 includes a vertical container 510, which contains a top area 512, a vertical spacer 514, a middle area 516, and a horizontal container 518. Horizontal container 518 includes a left area 524, a right area 520 and a horizontal spacer 522. Areas and spacers in FIG. 5 are empty, though middle area 516 is shaded, relative to the other areas and spacers. Each of the regions shown in the layout may be represented as conventional XML code or in any other format.

In accordance one embodiment of a method for using layout generator system 100, and with reference to FIGS. 4 and 5, upon being provided with layout panel 404, a user may first select "container" from toolbar 406 using the mouse. At that point, a first container 510 will be placed on layout panel 404 and the user will be provided with a property sheet 408 for that container. The user may use property sheet 408 to select property characteristics for container 510 such as, but not limited to, orientation, width, height, alignment, background color, border size and color, font name, font size, font color and the like. Additionally, user may position container 510 by dragging and dropping container to various locations on layout panel 404.

Next, a user may further define container 510 by clicking on container 510 and selecting "container," "area," or "spacer" from toolbar 406. This process adds an additional container 518, an area 512, 516, 520, 524, or a spacer 514, 522, within the original container 510. Each time a user adds a container, area or spacer, layout editor 210 may display property sheet 408, allowing the user to select properties for that container, area or spacer. Property sheets 408 for containers, areas and spacers may contain the same properties or may contain different ones. Additionally, once containers, areas and/or spacers are placed, they may be moved to other locations within layout panel 404, by dragging and dropping or by any other suitable method.

As described briefly above, once a user places one container on layout 402, the user can make various changes to layout 402 by selecting that container and using selections from toolbar 406. Aside from adding other containers, areas and/or spacers, user may delete containers, areas and/or spacers by selecting those elements within the original container and clicking on a "delete" button on toolbar 406. Or a user may move a container, area or spacer up, down, right or left on the document layout by selecting the component to be moved and selecting an "up," "down," "right," or "left" button on toolbar 406. Thus, toolbar 406 may contain many attributes or actions for use creating and/or modifying containers, areas and spacers.

As a user creates layout 402, by the method described in part above, layout manager 212 may be configured to monitor the properties of layout 402 and either approve or reject one or more aspects of layout 402. For example, if a user selects properties for one area, one container and one spacer, which are all to fit within an original container, and those properties would not allow those three components to fit within the original container, layout manager 212 might inform the user that that particular layout 402 is not possible. For example, with reference again to FIG. 5, if a user chose dimensions for left area 524, right area 520 and horizontal spacer 522 that were too large to allow those elements to fit within vertical container 510, layout manager 212 would inform the user that those dimensions would not work and/or that different dimensions should be chosen. Thus, layout manager 212 is configured in such a way that it can monitor and validate the overall layout 402 as well as properties of each component of that layout 402.

As described above, with reference to FIGS. 1 and 3, after a user has created and/or edited layout 402, layout 402 may be sent to layout server 104. Layout server 104 may store layout 402 or send it to database 102 for storage. That particular layout 402 may then be accessed and edited or used to create electronic documents or other electronic media by authorized user interfaces 108.

The corresponding structures, materials acts and equivalents of all elements in the claims below are intended to include any structure, material or acts for performing the functions in combination with other claimed elements as specifically claimed. Any steps recited in any method claim may be practiced in the order recited or in any other temporal or logical sequence. The scope of the invention should be determined by the appended claims and their legal equivalents, rather than by the examples given above. No element described herein should be interpreted as essential to the practice of the invention unless expressly described herein as "necessary" or "required."

What is claimed is:

1. A system for facilitating the creation of a document layout, said system comprising:

a layout server configured to receive a connection request from a client computer;

said layout server configured to establish an HTTP session with said client computer based on said connection request;

said layout server configured to provide a module to said client computer, wherein said module includes a layout editor configured to facilitate creation of a document template within a browser application during said HTTP session at said client computer and, wherein said layout editor performs the steps of:

positioning a first container within said document template in response to interaction of said user within a visual interface of said layout editor;

setting properties for said first container based on inputs from said user;

validating said document template by ensuring that at least one of:

defined and entered properties are logically consistent, wherein said validation is performed by a layout manager of said layout editor;

generating an HTML stream based on said document template; and transmitting said HTML stream to said layout server;

said layout server configured to receive said HTML stream from said client computer;

said layout server configured to convert said HTML stream to an XML document, wherein said XML document is stored in a data storage system;

a workflow application configured to facilitate approval of said document template, wherein said workflow application performs the steps of:

obtaining said document template from said data storage system;

selecting an approver based on an identity of said user, wherein said approver is associated with an object representing said user;

notifying said approver when said document template requires said approval; and receiving information indicative of at least one of said approval of said document template and non-approval of said document template which facilitates returning said document template for at least one of review and revision;

said layout editor configured to generate first web page content at said layout server based on said document template, wherein said first web page content is stored in said data storage system;

a content management utility configured to retrieve said first web page content from said data storage system;

said content management utility configured to retrieve second web page content from said data storage system; and, said content management utility configured to combine said first web page content with said second web page content.

2. The system of claim 1, wherein said first container comprises a software object configured to contain a visual element.

3. The system of claim 2, wherein said visual element comprises a second container.

4. The system of claim 2, wherein said visual element comprises a first area.

5. The system of claim 2, wherein said visual element comprises a spacer.

6. The system of claim 5, wherein said spacer is a section of said document layout that defines properties of a region between a second container and an area, wherein said second container and said area are placed within said first container.

7. The system of claim 1, wherein said layout editor is further configured to place a second container within said first container.

8. The system of claim 1, wherein said layout editor is further configured to place a first area within said first container.

9. The system of claim 8, wherein said layout editor is further configured to place a second area within said first area.

10. The system of claim 8, wherein said first area is a section of said document layout that contains a content element.

11. The system of claim 10, wherein said content element comprises text.

12. The system of claim 10, wherein said content element comprises an image.

13. The system of claim 1, wherein said layout editor is further configured to move said first container from one position to another position within said document template.

14. The system of claim 1, wherein said layout editor is further configured to delete said first container from said document template.

15. The system of claim 1, wherein said layout editor is further configured to change the size and proportions of said first container.

16. The system of claim 1, wherein one of said properties comprises an orientation for alignment of a visual element in said first container.

17. The system of claim 1, wherein one of said properties comprises a width of said first container.

18. The system of claim 1, wherein one of said properties comprises a height of said first container.

19. The system of claim 1, wherein one of said properties comprises a background color for said first container.

20. The system of claim 1, wherein one of said properties comprises a width of a border for said first container.

21. The system of claim 1, wherein one of said properties comprises font characteristics for text placed within said first container.

22. The system of claim 1, wherein said layout manager is further configured to generate said document layout in a format suitable for an external application.

23. The system of claim 22, wherein said format is XML code.

24. The system of claim 1, wherein said layout manager is further configured to allow access to said document layout upon input of an identifier by said user.

25. The system of claim 1, wherein said document layout is represented as XML code generated by said layout manager.

26. The system of claim 1, wherein said data storage device is further configured to allow access to said document layout upon input of an identifier by said user.

27. The system of claim 1, wherein said workflow application further comprises an interface for entering comments.

28. The system of claim 1, wherein said workflow application comprises:

said workflow application interfacing with an intranet server;

an author interfacing with said workflow application to at least one of edit and author webpage content in said workflow application, wherein said webpage content is in accordance with template rules defined by table structure;

a security apparatus configured to define content modification privileges for at least one cell of said table structure;

at least one reviewer interfacing with said workflow application for receiving and reviewing said webpage content; and an administrator interfacing with said workflow application for receiving webpage content reviewed and approved by said at least one reviewer and launching said webpage content to said intranet server for input to said internet server.

29. A method for facilitating creation of a document layout, said method comprising:

receiving a connection request from a client computer;

establishing an HTTP session with said client computer based on said connection request;

receiving a request for a document template;

displaying a document template within a browser application of said client based on said request;

providing a module to a client computer by way of said HTTP session, wherein said module includes an editor configured to facilitate modification of said document template within said HTTP session at said client computer;

positioning a first container within said document template in response to interaction of a user within a visual interface of said browser application, wherein said first container includes a software object containing a visual element;

setting properties for said first container based on inputs from said user;
validating said document template by ensuring that at least one of: defined and entered properties are logically consistent;
generating an HTML stream based on said document template;
receiving an HTML stream based on said document template, said first container, and said properties from said client computer;
generating an XML document based on said document template, said first container, and said properties, wherein said XML document is stored in a data storage system;
facilitating approval of said XML document using a workflow application, wherein said workflow application performs the steps of:
 obtaining said XML document from said data storage system;
 selecting an approver based on an identity of said user, wherein said approver is associated with an object representing said user;
 notifying said approver when said XML document requires said approval; and
 receiving information indicative of at least one of: said approval of said XML document and non-approval of said XML document, and returning said XML document for at least one of:
review and revision;
generating first web page content based on said XML document, wherein said first web page content is stored in said data storage system;
retrieving said first web page content from said data storage system;
retrieving second web page content from said data storage system; and,
combining said first web page content with said second web page content.

30. The method of claim 29, wherein said displaying step includes displaying said document template on a computer screen.

31. The method of claim 29, further including choosing a size for said first container.

32. The method of claim 29, further including moving said first container to a position on said document layout.

33. The method of claim 29, further including placing a second container within said first container on said document template.

34. The method of claim 29, further including placing a second container on said document template and placing a spacer between said first container and said second container.

35. The method of claim 34, further including choosing a size for said spacer.

36. The method of claim 29, further comprising placing an area within said first container.

37. The method of claim 36, further comprising placing a content component in said area, said content component being chosen from a list of possible content components.

38. The method of claim 29, wherein said storing step further comprises storing said document layout in said data storage system which facilitates access to users upon input of an identifier.

39. A method for facilitating the creation of a document template via a digital network, the method including:
 logging onto a layout manager application from a client computer;
 establishing an HTTP session with a layout server;
 requesting to create said document layout;
 receiving a module from said layout server by way of said HTTP session, wherein said module includes a layout editor;
 creating said document layout within a browser application during said HTTP session at said client computer;
 positioning a first container within said document template in response to interaction of said user within a visual interface of said layout editor;
 positioning a second container in an area within said first container;
 inputting values into said visual interface of said layout editor, wherein said values are applied to properties relating to at least one of: said first container and said second container;
 obtaining a validation of said document template by ensuring that at least one of: defined layout parameters and entered layout parameters are logically consistent;
 invoking generation of an HTML stream based on said documents template;
 sending said HTML stream to said layout manager, wherein said layout manager converts said HTML stream to an XML document, wherein said XML document is stored in a data storage system;
 selecting a scope for said XML document, said scope defining a group which may access said XML document;
 approving said XML document using a workflow application, wherein said workflow application performs the steps of:
  obtaining said XML document from said data storage system;
  selecting an approver based on an identity of a user, wherein said approver is associated with an object representing said user;
  notifying said approver when said XML document requires said approval; and,
  receiving information indicative of at least one of said approval of said XML document and non-approval of said XML document, and returning said XML document for at least one of review and revision;
 creating a web page using a layout manager utility, wherein said layout manager utility:
  generates first web page content based on said XML document, wherein said first web page content is stored in said data storage system;
  retrieves said first web page content from said data storage system;
  retrieves second web page content from said data storage system; and,
  combines said first web page content with said second web page content to create said web page.

40. The method of claim 39, wherein said step of logging onto said layout manager application further includes inputting a user name and password.

41. The method of claim 39, further including placing a spacer between at least two of said second container, of between said second container and said area and between at least two of said area.

42. The method of claim 39, further including specifying properties for said first container, said second container and said area.

43. The method of claim 39, further including adding a third container to said document layout, wherein said third container is outside of said first container.

44. The method of claim 43, further including placing a spacer between said first container and said third container.

45. The method of claim 39, wherein said authorizing said document layout further comprises the steps of:

> interfacing said workflow application to an intranet server;
> 
> interfacing an author with said workflow application to at least one of edit and author at least one webpage content element, wherein said at least one webpage content element is configured to be combined with a plurality of other webpage content elements;
> 
> interfacing said author with said workflow application to at least one of edit and author webpage content in said workflow application, wherein said webpage content is in accordance with template rules defined by table structure;
> 
> interfacing at least one database with said workflow application to store said at least one webpage content element, wherein said at least one webpage content element is configured to be inserted into a webpage;
> 
> interfacing at least one reviewer with said workflow application for receiving and reviewing said webpage content, wherein said reviewer is selected based on said identity of said layout editor;
> 
> interfacing an administrator with said workflow application for receiving webpage content reviewed and approved by said at least one reviewer; and,
> 
> launching said webpage content to said intranet server for input to said internet server.

* * * * *